United States Patent [19]
Carlqvist

[11] Patent Number: 5,003,832
[45] Date of Patent: Apr. 2, 1991

[54] MOTION TRANSMITTING MECHANISM

[75] Inventor: Stig G. Carlqvist, Paris, France

[73] Assignee: Stig G. Carlqvist Motor Consultant, (C.M.C.) Aktiebolag, Malmo, Sweden

[21] Appl. No.: 378,219

[22] PCT Filed: Jan. 28, 1988

[86] PCT No.: PCT/SE88/00030
§ 371 Date: Jun. 28, 1989
§ 102(e) Date: Jun. 28, 1989

[87] PCT Pub. No.: WO88/05878
PCT Pub. Date: Aug. 11, 1988

[30] Foreign Application Priority Data
Jan. 28, 1987 [SE] Sweden .................. 8700321

[51] Int. Cl.$^5$ .................................... F16M 21/18
[52] U.S. Cl. ................................ 74/51; 123/179 R
[58] Field of Search .......................... 74/51, 579 R; 123/179 R, 52 A

[56] References Cited
U.S. PATENT DOCUMENTS

| 2,229,788 | 1/1941 | Appleton | 74/51 |
| 4,138,897 | 2/1979 | Ross | 74/51 |

FOREIGN PATENT DOCUMENTS

| 2439213 | 3/1976 | Fed. Rep. of Germany | 74/51 |
| 676886 | 2/1930 | France | 74/51 |
| 47360 | 8/1919 | Sweden | 74/51 |
| 326314 | 12/1957 | Switzerland | 74/51 |
| 813791 | 5/1959 | United Kingdom | 74/51 |

Primary Examiner—Leslie A. Braun
Assistant Examiner—Scott Anchell
Attorney, Agent, or Firm—Dvorak and Traub

[57] ABSTRACT

A motion transmitting mechanism for heat engines, refrigerating machines and heat pumps which are hermetically sealed or provided with rotary shaft seals and have reciprocating pistons connected to the motion transmitting mechanism (11) by means of connecting rods (33, 34, 23, 24), is provided with two counterrotating crank systems which are centered along a single center line, whereby the lateral forces of the pistons counteract each other so as to be eliminated and allow the use of permanent grease-lubricated and sealed rolling bearings (22, 25, 26, 35, 36).

13 Claims, 4 Drawing Sheets

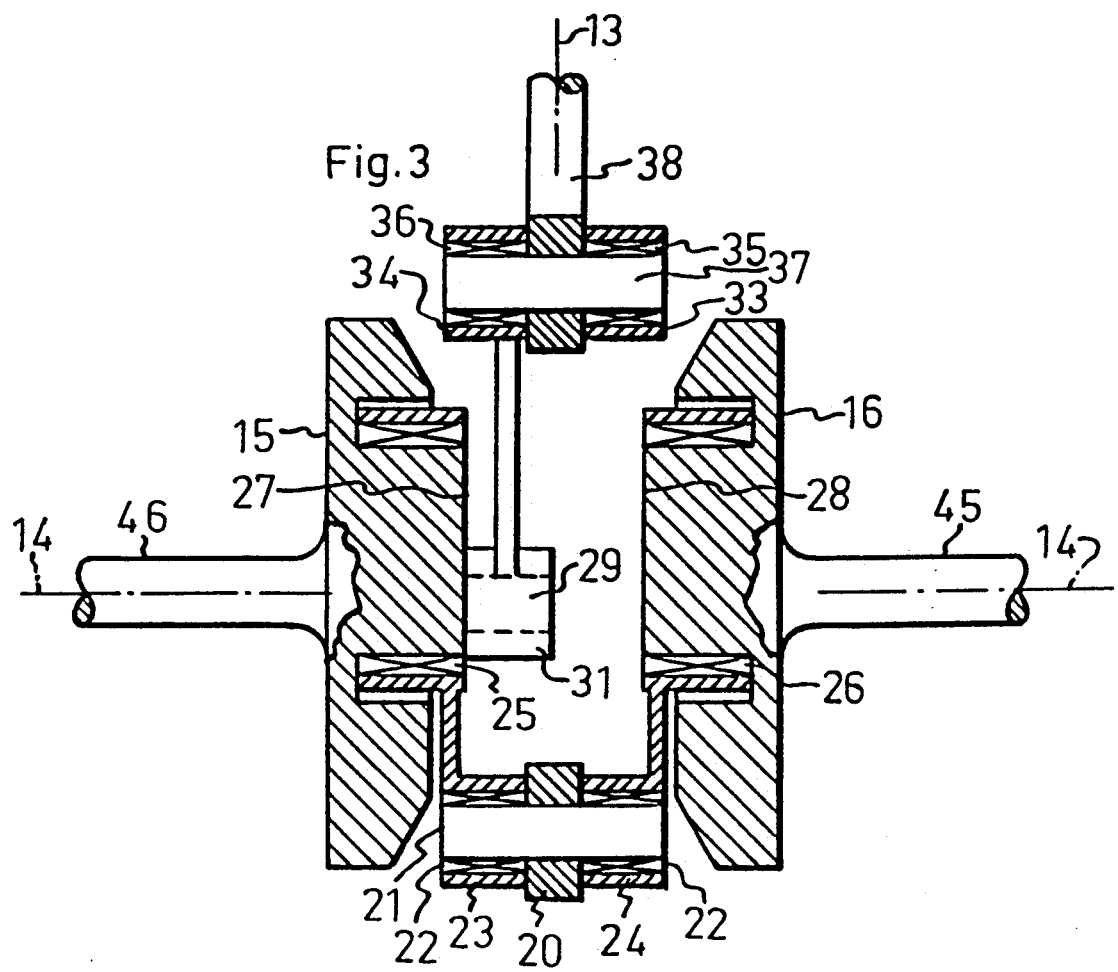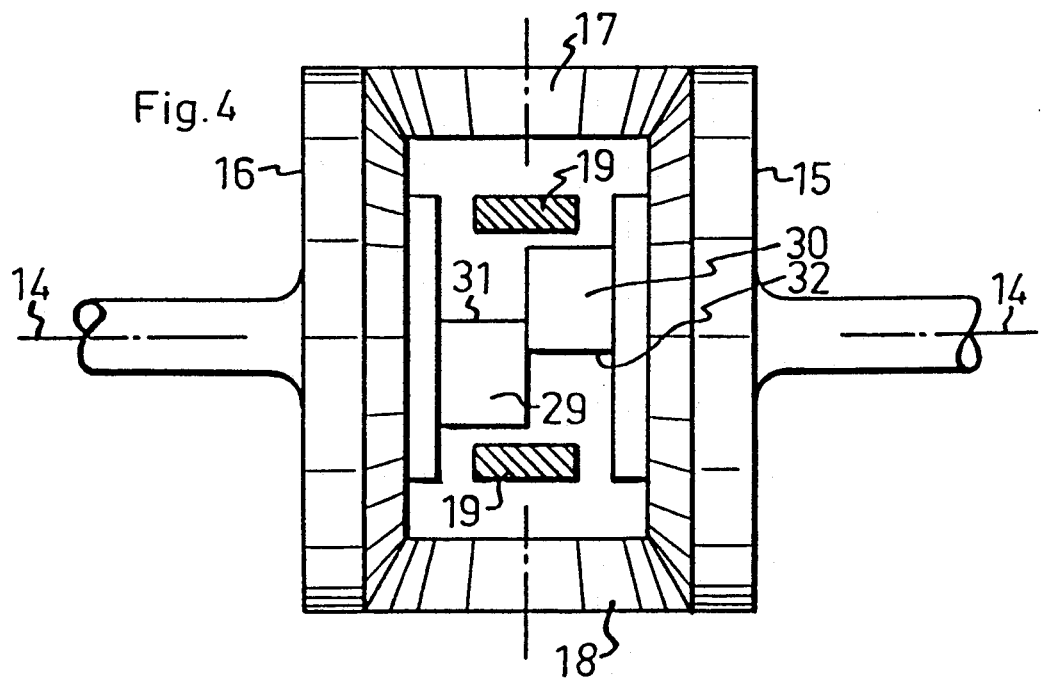

MOTION TRANSMITTING MECHANISM

SUMMARY OF THE INVENTION

The present invention relates to motion transmitting mechanisms for use in heat engines, refrigerating machines and heat pumps, hermetically sealed or provided with rotary shaft seals and operating according to the external heat supply principle and the heat removal principle, respectively, in compliance with the Stirling, Ericsson or similar thermodynamic cycles. These machines are enclosed in a hermetic casing with or without rotary shaft seals and are pressurized by a working medium suited for their function, preferably helium or hydrogen gas. A common feature of these machines is that their proper function relies on a system of heat exchangers which must necessarily be protected from oil contamination preventing heat transfer. In view hereof, the motion transmitting mechanisms included must either be lubricated by systems of circulating or splashing oil which are then separated and sealed from the heat exchangers and the reciprocating pistons associated therewith by means of complicated dynamic linear sealing devices, or, which is preferable, be provided with motion transmitting mechanisms which operate without circulating and splashing lubricating oil and, thus, do not require the above-mentioned dynamic sealing devices for the lubricating oil.

The motion transmitting mechanisms for the above-indicated machines have a number of functions integrated therein which must be maintained to ensure satisfactory operation of the machines:

Guide pistons with a phase angle suitable and most preferably optimal for the thermodynamic process;

Guide the pistons in a manner that does not give rise to lateral forces on the pistons, e.g. from the connecting rods in a crank mechanism, which would necessitate lubrication with circulating or splashing lubricating oil;

Transmit kinetic energy from one part of the machine which produces energy, to another part thereof which absorbs energy;

Wholly or partly counterbalance mass forces of inertia produced, in order to avoid vibrations.

The machines indicated above are generally divided into kinematic machines and free-piston machines, as well as an intermediate form which may be referred to as semifree piston machines. All these machines may serve in different contexts as heat engines, refrigerating machines and heat pumps, depending on the design and mode of operation of the thermodynamic system. The need of motion transmitting mechanisms is felt primarily in kinematic and semi-free piston machines while true free-piston machines generally function properly without any motion transmitting mechanism.

Kinematic machines have hitherto been dependent on circulating or splashing lubricating oil systems, necessitating complicated and operationally sensitive linear sealing devices. The risk of oil leakage from the motion transmitting mechanism of the machine to the piston and heat exchanger unit has so far been an embarrassing obstacle to a successful commercial use of kinematic machines.

Semi-free piston machines transmit the working forces from reciprocating so-called working pistons to components of the system which, also by a reciprocating movement, absorb the generated forces, or transmit working forces from a reciprocating movement in a power source to reciprocating pistons absorbing energy. These functions are ensured by linear movements which do not require any motion transmitting mechanism. On the other hand, a motion transmitting mechanism is required for guiding non-working or work-absorbing pistons, so-called displacement pistons. Since the required forces to be transmitted in such a motion transmitting mechanism are comparatively very small, it is possible to use bearings with limited, sealed grease lubrication, even if the motion transmitting mechanism is also used for completely or partly counterbalance mass forces of inertia in the system to avoid vibrations. To this end, relatively complicated and expensive motion transmitting mechanisms of the so-called rhombic gear type have been considered necessary to fulfil these functions in an adequate way.

As mentioned above, a successful commercial use of kinematic machines or semi-free piston machines has not been possible because of the lack of a simple and inexpensive motion transmitting mechanism which can operate during a long period of time without the need of circulating or splashing lubricating oil systems and, thus, of necessarily complicated linear sealing devices.

The object of the present invention is to provide a motion transmitting mechanism which does not require a circulating or splashing oil system, but yet satisfies all the demands placed on a simple and inexpensive motion transmitting mechanism which can be used for both kinematic machines and semi-free piston machines.

Another object is to allow complete or practically complete counterbalancing of the mass forces of inertia existing in these machines.

Yet another object is to provide transmission both of reciprocating forces for linear components (driving and driven) and of rotary forces for rotating components (driving and driven) and, where applicable, of a combination of reciprocating forces for components having both a reciprocating and a rotary function.

Finally, the invention aims at providing a motion transmitting mechanism acting between driving and driven components in the above-indicated machine systems of widely different types: heat engines, refrigerating machines and heat pumps operating according to the Stirling, Ericsson or similar thermodynamic cycles, rotary and linear electric generators and motors, as well as rotary and linear hydraulic and pneumatic pumps and motors.

The objects stated above are achieved in that the motion transmitting mechanism consists of two counter-rotating crank systems centred along a single centre line, the lateral forces of the pistons, driven by connecting rods, counteracting each other and thus being eliminated. Further, a suitable and optimal phase angle can be selected for the movements of the working and displacement pistons of the machines concerned or, where applicable, between different pistons in multi-cylinder machines. It has been found that the geometry of the transmitting motion mechanism according to the invention allows the use of permanently grease-lubricated and sealed rolling bearings of the needle or ball type, such that circulating or splashing lubricating oil need not be used. Moreover, motion transmitting mechanisms of the type used in the invention make it possible to wholly or partly counterbalance the mass forces of inertia produced by the movement of the pistons.

In motion transmitting mechanisms designed in accordance with the present invention, the reciprocating movement of the pistons can be used in one or more of the following ways:

As a linear reciprocating movement;
As a rotary movement on two counterrotating shafts with the same speed of rotation; and
As a rotary movement on a single rotating shaft.

BRIEF DESCRIPTION OF THE DRAWINGS

FIG. 3 is a sectional elevation view of the motion transmitting mechanism of FIG. 2.

FIG. 4 is a partial sectional plan view of the motion transmitting mechanism of FIG. 2.

DESCRIPTION OF THE PREFERRED EMBODIMENT(S)

Figure 1A:
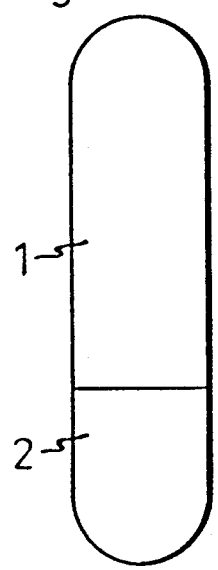
FIGS. 1a-1c schematically represent energy systems with different driving and driven units.
Figure 1B:
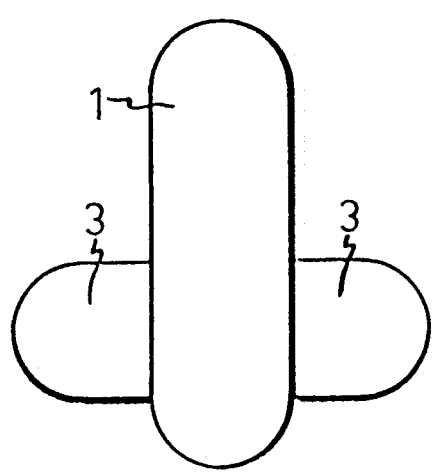
Figure 1C:
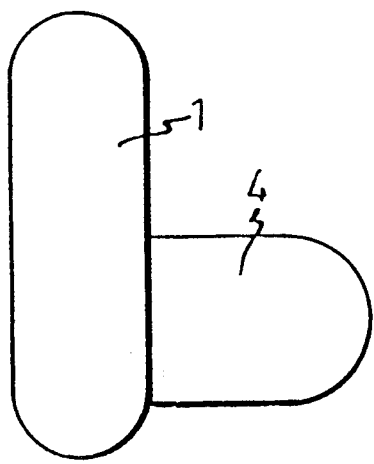

Examples of the applications described will be illustrated with reference to heat engines of the Stirling type driving a linear or a rotary generator(-s). FIGS. 1a-1c represent energy systems where the components included in the system (1)-(4) represent different driving and driven units. In a first case, component (1) is a heat engine of the Stirling type, the driving energy-producing unit, while (2), (3) and (4) are electric generators, the driven energy-absorbing units. In FIG. 1a, (2) is a linear electric generator, and the transmission of energy takes place by linear reciprocating movements between the working piston of the heat engine chosen and the linear electric generator. In FIG. 1b, (3) designates counterrotating electric generators, and the transmission of energy here takes place by means of two rotary shafts, one shaft rotating in an opposite direction with respect to the other. In FIG. 1c, finally, (4) is a rotary electric generator which by means of a single shaft conveys all of the energy produced. In the cases related, the energy systems in FIGS. 1a-1c are all hermetically sealed and the working gas of the heat engine fills the entire system, thus making seals for entrapping the working gas in the system unnecessary.

In a second embodiment, the same Figures can be used to illustrate energy systems where (1) is a driven energy-absorbing unit, such as a refrigerating machine or a heat pump, and where (2), (3) and (4) are electric motors, (2) a linear electric motor, (3) two electric counterrotating motors, and (4) a single electric rotary motor. Also these energy systems are hermetically sealed and filled with the working gas for the driven refrigerating machine or the heat pump.

A third embodiment may be mentioned where FIGS. 1a-1c represent energy systems where (1) again is a driving energy-producing unit, e.g. a heat engine of the Stirling type, while units (2), (3) and (4) are driven energy-absorbing units, e.g. hydraulic pumps. In this case, (2) in FIG. 1 is a linear hydraulic pump which for its function requires a hermetically sealed metal membrane serving as a seal between the gaseous working medium, e.g. helium, of the heat engine and the liquid working medium, hydraulic oil, of the hydraulic pump. The units (3) in FIG. 1b are counterrotating hydraulic motors which for their function require a rotary shaft seal between the working gas of the heat engine and the hydraulic oil of the hydraulic motor. The unit (4) in FIG. 1c is a rotary hydraulic motor, also provided with a rotary shaft seal. In this third embodiment, the energy system still is hermetically sealed and pressurized, but because of the different working media in the driving and the driven units, entrapping seals are required, which was not necessary in the first two embodiments.

Figure 2:
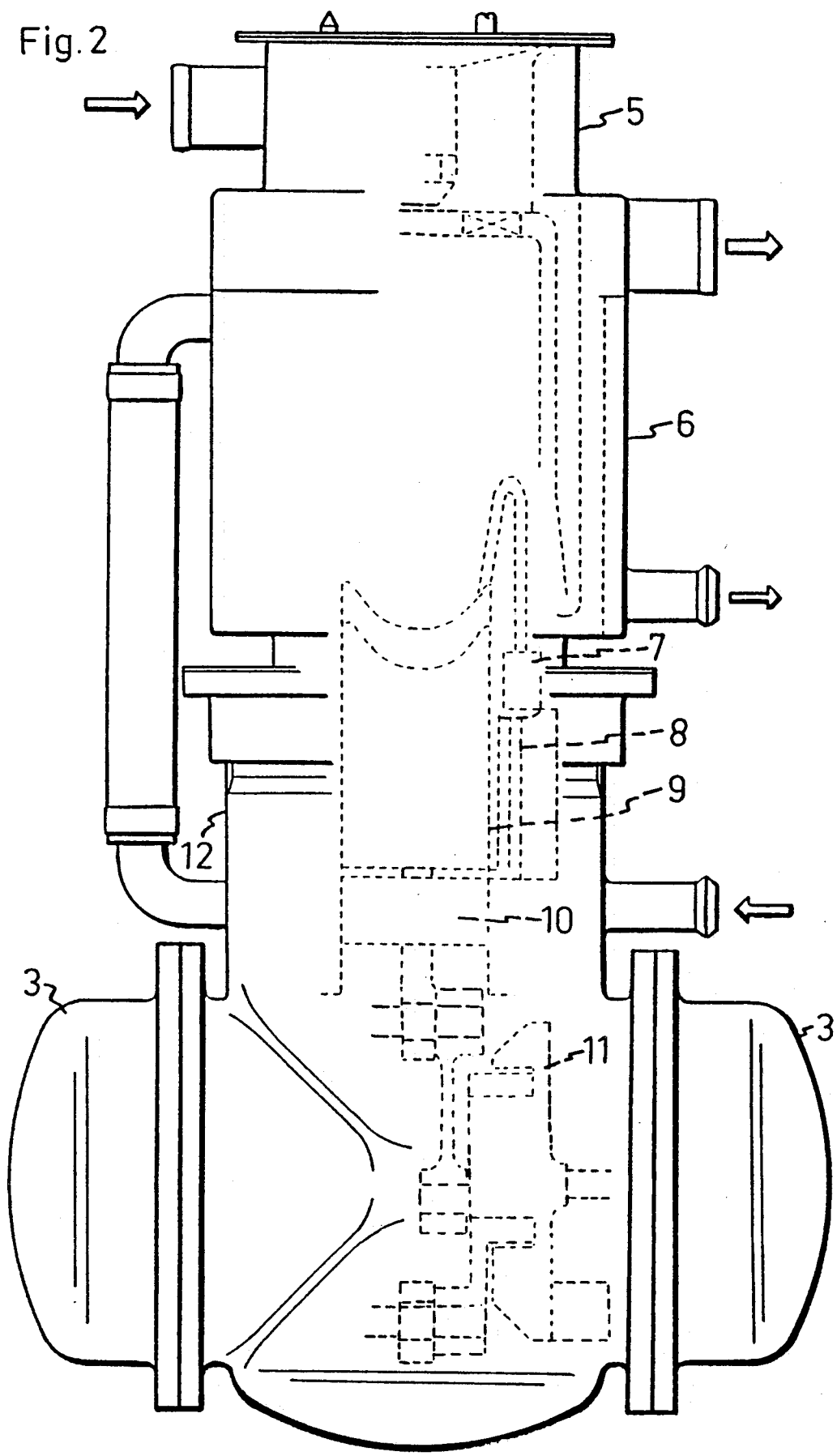
FIG. 2 is an embodiment where the driving unit is a heat engine and the driven units are counterrotating electric generators.

Alternative 1b of the first embodiment will now be described in more detail hereinbelow. FIG. 2 shows an embodiment corresponding to FIG. 1b, where the driving unit is a heat engine operating according to the thermodynamic Stirling cycle and where the driven units are two counterrotating electric generators. At the right-hand portion of the Figure, the broken lines indicate the components included in the system, where (5) is the energy source of the motor, a combustion chamber for gaseous or liquid fuel, (6) is the air preheater for the combustion chamber and a water heater for using waste heat to heat the cooling water leaving the motor. Further, (7) is the regenerator of the motor, (8) the radiator, (9) the displacement piston and (10) the working piston. The motion transmitting mechanism (11), which will be described in more detail hereinbelow, serves both to guide the displacement piston (9) at a certain phase angle in relation to the working piston (10), and to convert the linear movement of the working piston, without creating any lateral forces on the piston, into two counterrotating movements driving the electric generators (3). At the same time, the motion transmitting mechanism counterbalances, wholly or partly, the mass forces of inertia occasioned by the pistons. The whole energy system is hermetically sealed and pressurized by the working gas, e.g. helium, of the heat engine. Since the entire system contains only one working medium, there is no need of any entrapping sealing devices between the units included in the system. Energy is supplied to the system by means of fuel which is combusted with air. The energy is converted by the heat engine into kinetic energy, in turn converted by the electric generators into electric energy which is finally carried away through electric cables having hermetically sealed lead-throughs through the pressurized casing of the energy system. Heat which is not converted into electric energy is recovered as hot water useful for heating purposes, if desired. The primary object of the motion transmitting mechanism (11) is to transmit the kinetic energy produced by the heat engine to the electric generators in a manner which for reliable and long-term operation, does not require any circulating or splashing lubricating oil.

The essential motion transmitting mechanism will now be described in greater detail with reference to FIGS. 3 and 4, where FIG. 3 is a section of the mechanism in a plane containing both the center line (13) of the heat engine and the common center line (14) of the electric generators, while FIG. 4 is a section of the mechanism which is orthogonal to the center line of the heat engine, but which contains the center line (14) of the electric generators. The motion transmitting mechanism consists of two counterrotating wheels (15) and (16) which are synchronized with respect to each other by means of the wheels (17) and (18) which are visible in FIG. 4. The counterrotating wheels (15) and (16) are connected by gear teeth to the synchronizing wheels (17) and (18). For the function of the motion transmitting mechanism, only one of the two synchronizing wheels is necessary. The synchronizing wheels, which do not transmit any energy and therefore are not subjected to any appreciable gear forces, are made of plastic, optionally with self-lubricating properties.

Figure 5:
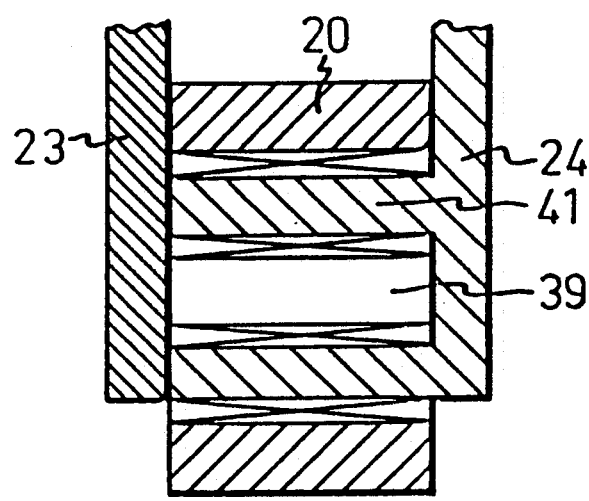
FIG. 5 is a sectional detail view of the motion transmitting mechanism of FIG. 2.

The working piston, component (10) in FIG. 2, of the heat engine has two piston rods (19) in FIG. 4 which are fixed to the piston as an extension of the piston skirt and extend through the motion transmitting mechanism and finally are fixed to the yoke (20) in FIG. 3. The center of the yoke contains a shaft both ends of which are provided with rolling bearings (22) of the needle type with delimited permanent grease lubrication. Two connecting rods (23) and (24) are mounted on these bearings with their small ends. The connecting rod (23) is mounted with its large end in the wheel (15) rotating in one direction, while the connecting rod (24) is mounted with its large end in the wheel (16) rotating in the opposite direction. Like the small ends, the large ends of the connecting rods are provided with rolling bearings (25) and (26) of the needle type with delimited permanent grease lubrication. Since the wheels (15) and (16) rotate in opposite directions, the small ends of the connecting rods will constantly move in a plane shown in FIG. 3 in the same direction and in an identical fashion, while the large ends in a plane perpendicular to the plane shown in FIG. 3 will move in opposite directions. In this manner, the lateral forces on the yoke (20) and on the working piston of the heat engine will be eliminated. A small torque is produced in the yoke (20), which is however estimated to be taken up by the piston rods of the working piston or, if this should prove necessary, be eliminated by a special mounting of the small ends of the connecting rods, as shown in FIG. 5. The piston rods of the working piston appear more clearly from FIG. 6.

The connecting rods of the working pistons are mounted with their large ends by means of rolling bearings on shafts (27) and (28) countersunk in the wheels (15) and (16). These shafts are so dimensioned as to contain the pins (29) and (30) which, by means of rolling bearings of the needle type with delimited permanent grease lubrication, carry the large ends (31) and (32) of the connecting rods (33) and (34), in turn guiding the displacement piston (9) of the heat engine in FIG. 2. This guiding is effected via the rolling bearings (35) and (36) of the needle type with delimited permanent grease lubrication, said bearings being provided on the pin (37) in the piston rod (39) of the displacement piston.

Figure 7:
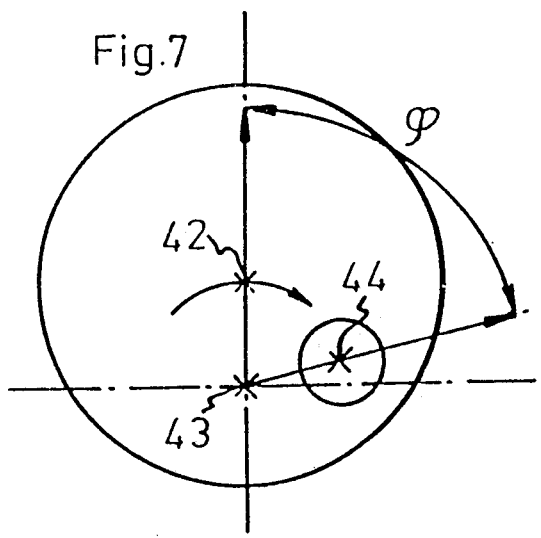
FIG. 7 is representation of the operational characteristics of the motion transmitting mechanism of FIG. 2.

The pins for the large ends of the connecting rods (29) and (30) of the displacement piston are so positioned in the countersunk shafts (27) and (28) for the large ends of the connecting rods of the working piston that a suitable or optimal phase angle between the movement of the pistons is obtained. FIG. 7 shows how this is achieved.

In the same way as for the connecting rods of the working pistons, the large ends of the two connecting rods of the displacement piston will move, in a plane perpendicular to the plane in FIG. 3, in opposite directions, such that lateral forces on the piston rod (38) of the displacement piston are avoided. In the same way as for the yoke of the working piston, a small torque can be eliminated by a bearing of the type shown in FIG. 5.

Normally, it is not considered that the small torques produced in the small ends of the connecting rods need be counteracted but, if desirable or necessary in particular cases, the mounting should be carried out in the manner shown in FIG. 5, where the connecting rods of the working piston are designated (23) and (24). In this case, the small end of one connecting rod has a pin (39) mounted by means of rolling bearings of the type previously described, within and concentrically with the pin (41) of the other connecting rod, which pin in turn is mounted by means of rolling bearings in the yoke (20) of the working piston. In this manner, the tendencies of torsion in the yoke of the working piston are eliminated. Similarly, the tendencies of torsion in the piston rod of the displacement piston can be eliminated.

Figure 6:
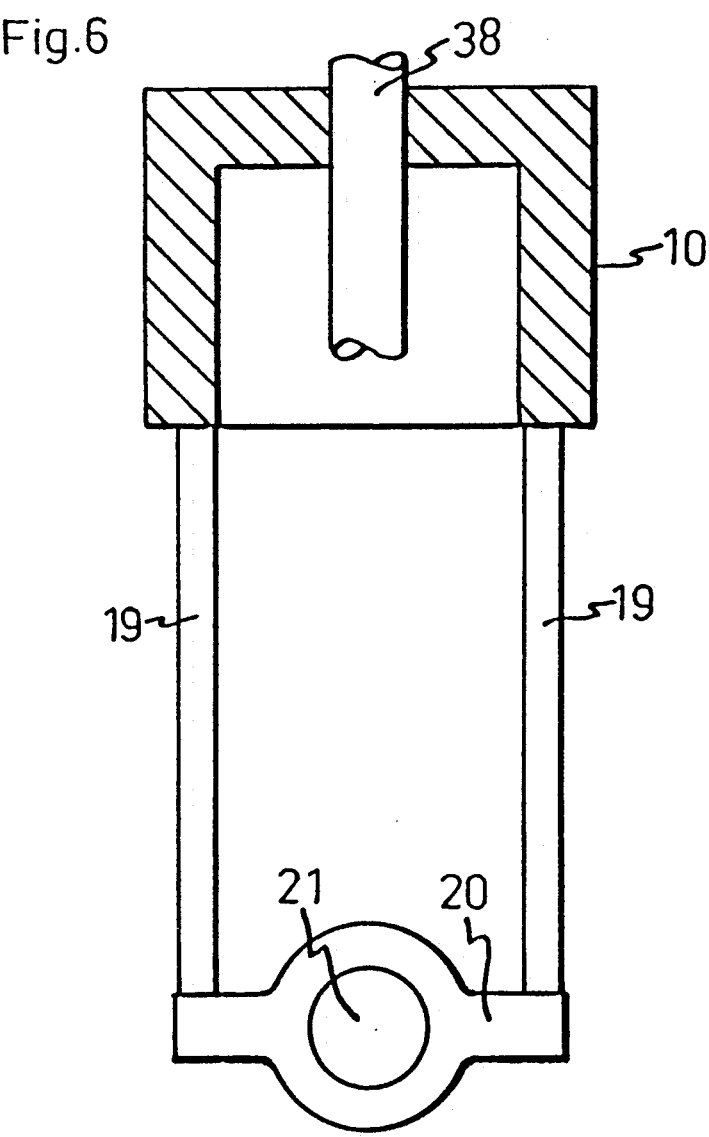
FIG. 6 is a partial sectional elevation view of the motion transmitting mechanism of FIG. 2.

The connection of the working piston 10 with its passage for the piston rod (38) of the displacement piston, to its yoke (20) appears more clearly from FIG. 6 where the piston rods (19) of the working piston constitute a direct extension of the skirt of the working piston. The piston rods are fixed to the yoke (20) having a shaft (21), as earlier described.

FIG. 7 shows how the phase angle $\phi$ between the crank movement of the working piston and the crank movement of the displacement piston is obtained by the center (42) of the crank pin of the large end of the working piston connecting rod moving about the center of the motion transmitting mechanism (43) in a manner offset $\phi$ degrees in relation to the center (44) of the crank pin of the large end of the displacement piston connecting rod. In this manner, it is possible to select a suitable and optimal phase angle for the heat engine or, where applicable, the refrigerating machine or the heat pump.

The three types of driving as illustrated in FIGS. 1a-1c can also be seen in FIGS. 3 and 4 and in FIG. 6. The linear movement in FIG. 1a is transmitted from the working piston (10), its piston rods (19) and its yoke (20), as shown in FIG. 6, directly to a linear component in the machine (2), whether this is a linear electric generator or a motor or a linear hydraulic machine.

The two counterrotating machines (3) in FIG. 1b are driven by the shaft ends (45) and (46) in FIG. 3.

The rotary machine in FIG. 1c, finally, is driven by one of the two synchronizing wheels (17) or (18) in FIG. 4. In this case, the synchronizing wheel and the counterrotating wheels (15) and (16) should consist of materials which are permanently lubricated with a solid lubricant or impregnated with a bound liquid lubricant. In this manner, circulating or splashing lubricating oil can be avoided which would contaminate the heat exchangers of a heat engine, refrigerating machine or heat pump operating according to the Stirling, Ericsson or similar thermodynamic cycles.

I claim:

1. A motion transmitting mechanism for a machine, such as a heat engine, refrigerating machine and heat pump, which is hermetically sealed or provided with a rotary shaft seal, said machine having at least one reciprocating piston connected to the motion transmitting mechanism by means of connecting rods, characterized in that the motion transmitting mechanism has two counterrotating crank systems which are centered along a single center line, whereby lateral forces of the piston counteract each other and thus are eliminated.

2. Mechanism as claimed in claim 1, in which the machine has at least one displacement piston and at least one working piston, characterized in that the reciprocating pistons are connected by separate connecting rods, to the motion transmitting mechanism which serves to guide the displacement piston at a certain phase angle ($\phi$) in relation to the working piston.

3. Mechanism as claimed in claim 2, characterized in that said motion transmitting mechanism serves to convert linear movement of the working piston, without producing any lateral forces thereon, into two counterrotating movements which drive at least one energy-absorbing unit, or are driven by at least one energy-producing unit.

4. Mechanism as claimed in claim 3, characterized in that the two counterrotating crank systems comprise two counterrotating wheels which are synchronized in relation to each other by means of at least one synchronizing wheel.

5. Mechanism as claimed in claim 3, characterized in that the working piston is provided with two piston rods which are fixed at one end to the piston, extend through the motion transmitted mechanism and are fixed at the other end to a yoke having at its center a shaft, at the ends of which the connecting rods of the working piston are mounted with one end, one connecting rod being mounted with its other end in one of said counterrotating wheels and the other connecting rod being mounted with its other end in the other counterrotating wheel.

6. Mechanism as claimed in claim 2, characterized in that the working piston is provided with two piston rods which are fixed at one end to the piston, extend through the motion transmitting mechanism and are fixed at the other end to a yoke having at its center a shaft, at the ends of which the connecting rods of the working piston are mounted with one end, one connecting rod being mounted with its other end in a rotating wheel and the other connecting rod being mounted with its other end in a counterrotating wheel.

7. Mechanism as claimed in claim 6, characterized in that the connecting rods of the working piston are mounted on shafts countersunk in the wheels and containing connecting rod pins on which one end of the connecting rods of the displacement piston are mounted, the other ends of the connecting rods being mounted on a pin in a piston rod of the displacement piston.

8. Mechanism as claimed in claim 7, characterized in that the connecting rod pins for one end of the connecting rods for the displacement piston are so positioned in the countersunk shafts for the other end of the connecting rods for the working piston that a suitable or optimal phase angle ($\phi$) between the movements of the pistons is obtained.

9. Mechanism as claimed in claim 6, characterized in that the connecting rod pins for one end of the connecting rods for the displacement piston are so positioned in the countersunk shafts for the other end of the connecting rods for the working piston that a suitable or optimal phase angle ($\phi$) between the movements of the pistons is obtained.

10. Mechanism as claimed in claim 9, characterized in that all mountings for said connecting rods and shafts are rolling bearings, preferably of the needle or ball type with sealed, permanent grease lubrication, whereby to eliminate the need for a lubricant with circulating or splashing lubricating oil.

11. Mechanism as claimed in claim 2, characterized in that the two counterrotating crank systems comprise two counterrotating wheels which are synchronized in relation to each other by means of at least one synchronizing wheel.

12. Mechanism as claimed in claim 1, characterized in that the motion transmitting mechanism has two counterrotating wheels which are synchronized in relation to each other by means of at least one synchronizing wheel.

13. Mechanism as claimed in claim 12, characterized in that the piston is provided with two piston rods which are fixed at one end to the piston, extend through the motion transmitting mechanism and are fixed at the other end to a yoke having at its center a shaft, at the ends of which the connecting rods of the piston are mounted with one end, one connecting rod being mounted with its other end in one of said counterrotating wheels and the other connecting rod being mounted with its other end in the other counterrotating wheel.

* * * * *